(12) United States Patent
Stephenson et al.

(10) Patent No.: US 9,650,218 B1
(45) Date of Patent: May 16, 2017

(54) VEHICLE CONVEYOR ASSEMBLY WITH HEATER

(71) Applicant: Stephenson Technologies Inc., Barrie (CA)

(72) Inventors: Robert Stephenson, Barrie (CA); Paul Adams, Barrie (CA)

(73) Assignee: Stephenson Technologies Inc., Barrie, ON (CA)

( * ) Notice: Subject to any disclaimer, the term of this patent is extended or adjusted under 35 U.S.C. 154(b) by 0 days.

(21) Appl. No.: 15/013,357

(22) Filed: Feb. 2, 2016

(51) Int. Cl.
| B65G 69/20 | (2006.01) |
| B65G 15/14 | (2006.01) |
| B65G 21/08 | (2006.01) |
| B65G 45/00 | (2006.01) |
| B60S 3/00  | (2006.01) |

(52) U.S. Cl.
CPC .............. *B65G 69/20* (2013.01); *B60S 3/004* (2013.01); *B65G 15/14* (2013.01); *B65G 21/08* (2013.01); *B65G 45/00* (2013.01); *B65G 2201/0294* (2013.01)

(58) Field of Classification Search
CPC ........ B65G 15/12; B65G 15/14; B65G 21/08; B65G 45/00; B65G 69/20; B65G 2201/0294; B60S 3/004; B60S 3/04
USPC .................................................. 198/493, 494
See application file for complete search history.

(56) References Cited

U.S. PATENT DOCUMENTS 5,024,319 A * 6/1991 Dixon ..................... B65G 15/00
126/271.2 C
6,134,735 A * 10/2000 Zamensky ................ B60S 3/04
134/123
D514,755 S     2/2006 Essenberg
6,994,204 B2 * 2/2006 Buescher ................ B66B 31/00
198/335
7,530,362 B2 * 5/2009 McCormick .......... B08B 17/025
134/104.1
D616,565 S     5/2010 Essenberg
(Continued)

FOREIGN PATENT DOCUMENTS

| FR | 2068986 A5 | 9/1971 |
| GB | 1100583 A  | 1/1968 |

(Continued)

OTHER PUBLICATIONS

Office Action for U.S. Appl. No. 15/148,626 dated Jan. 12, 2017.

*Primary Examiner* — Gerald McClain
*Assistant Examiner* — Keith R Campbell
(74) *Attorney, Agent, or Firm* — Millman IP Inc.

(57) ABSTRACT

A conveyor system for moving a wheeled structure through a service line, the conveyor system including at least one endless belt mounted longitudinally through the service line. The belt has an upper transport portion for moving the vehicle through the service line, and a lower return portion with a support deck below the upper transport portion to support the belt. A debris deflector is mounted between the upper transport portion and the lower return portion to protect the lower return portion from debris falling through the support deck. A heater is mounted between the debris deflector and the support deck along at least a portion of the length of the service line. The debris deflector and the support deck define a region of higher heat concentration relative to an area below the debris deflector.

18 Claims, 7 Drawing Sheets

(56) References Cited

U.S. PATENT DOCUMENTS

| | | | |
|---|---|---|---|
| 8,413,669 B2 * | 4/2013 | Barreyre | B60S 3/004 134/124 |
| 8,662,292 B2 | 3/2014 | Brackemyer et al. | |
| 2006/0191773 A1 | 8/2006 | Horn | |
| 2007/0068554 A1 | 3/2007 | Essenberg | |
| 2010/0206341 A1 | 8/2010 | Essenburg | |
| 2012/0216835 A1 | 8/2012 | Essenburg | |
| 2013/0200061 A1 | 8/2013 | Barreyre | |

FOREIGN PATENT DOCUMENTS

| | | | |
|---|---|---|---|
| GB | 1114418 | A | 5/1968 |
| GB | 1185331 | A | 3/1970 |
| GB | 1385800 | A | 2/1975 |
| GB | 1398266 | A | 6/1975 |
| GB | 1432772 | A | 4/1976 |
| GB | 8429035 | | 12/1984 |
| GB | 2150093 | B1 | 11/1986 |

* cited by examiner

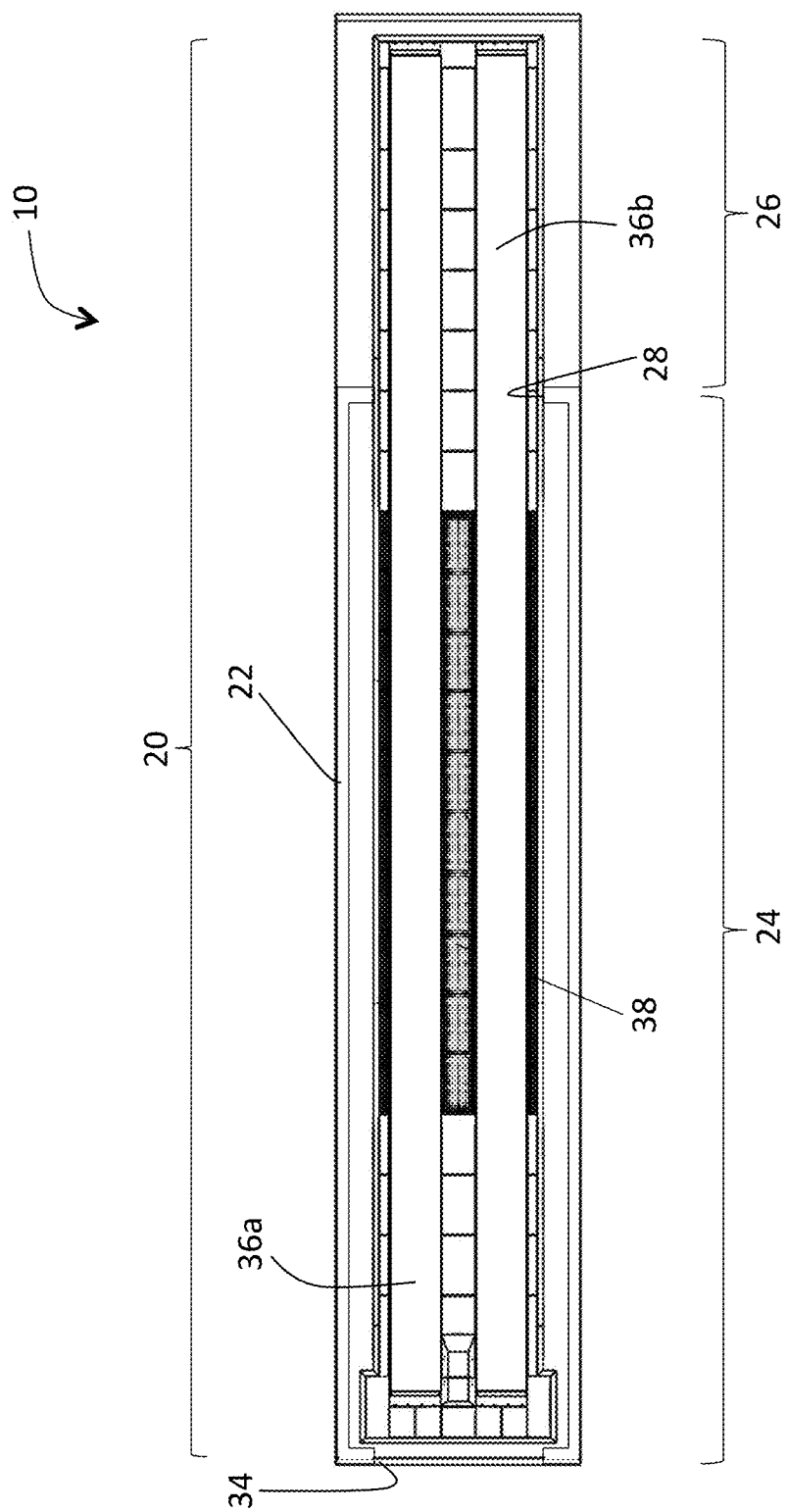

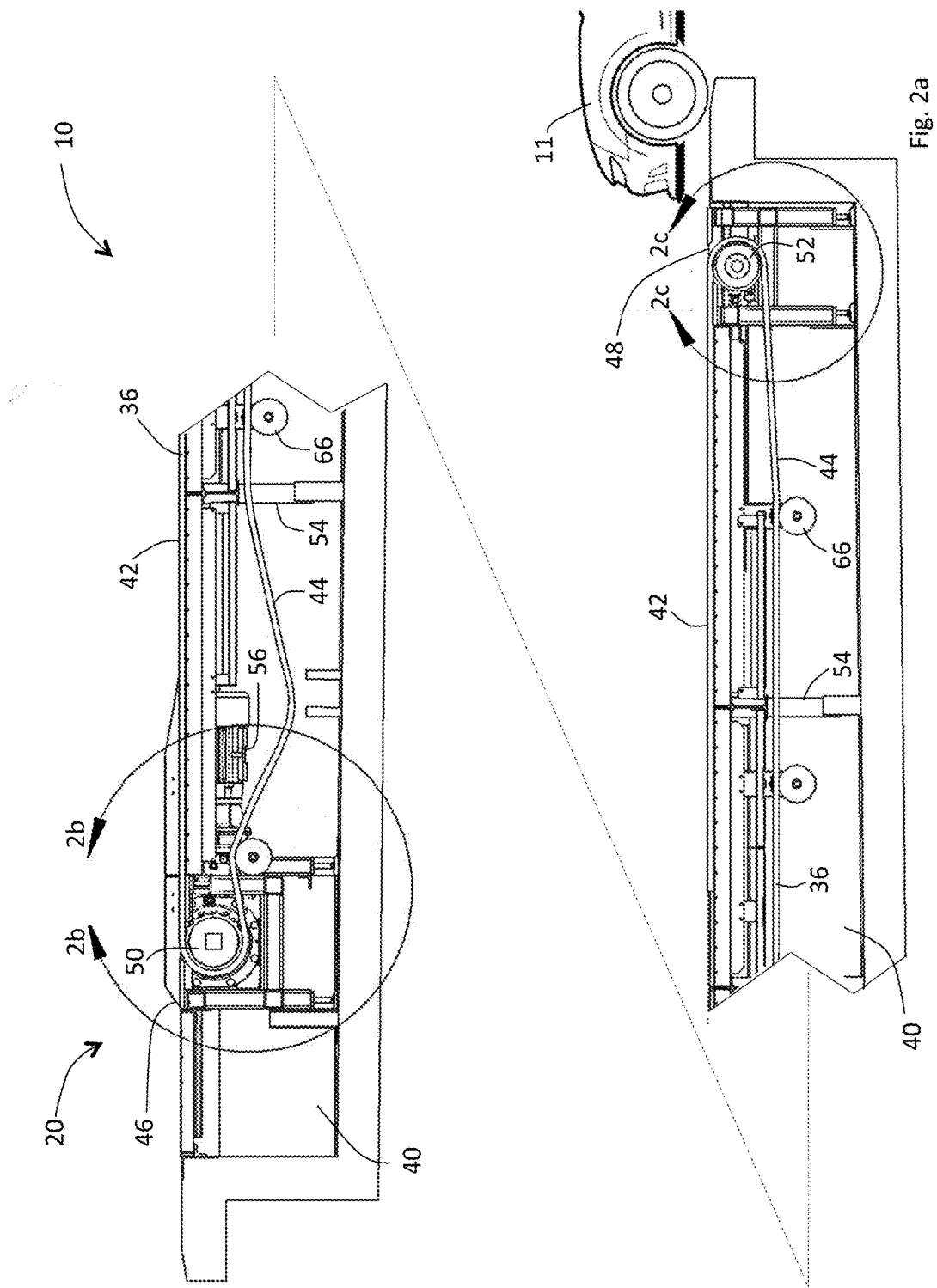

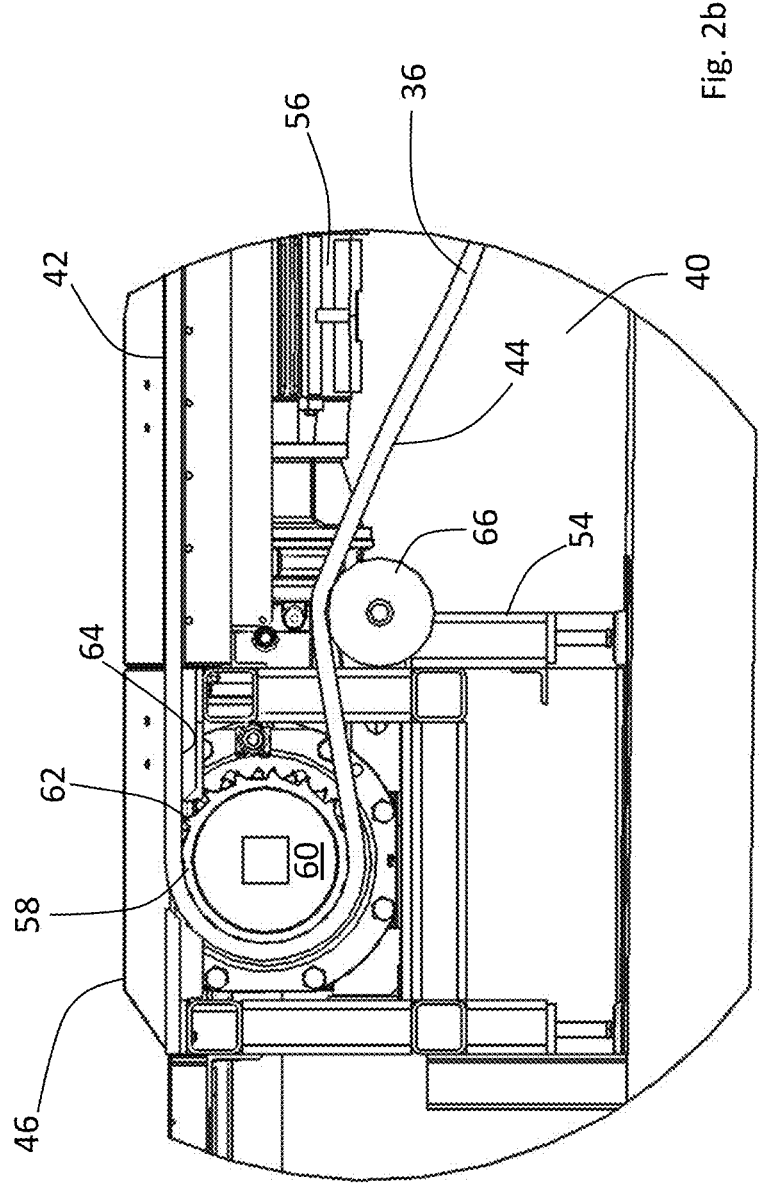

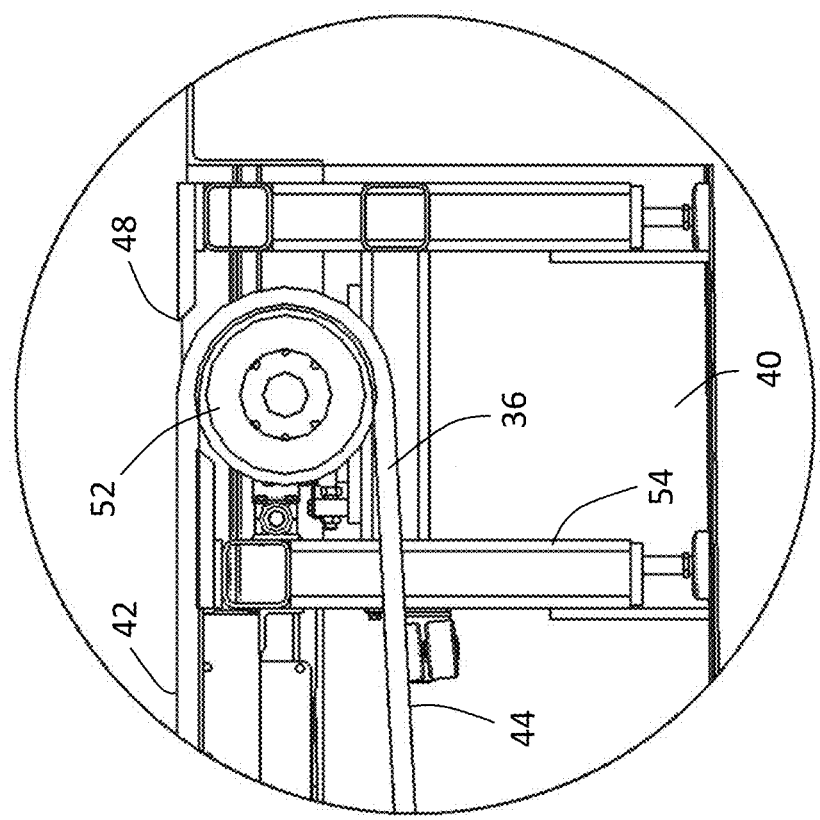

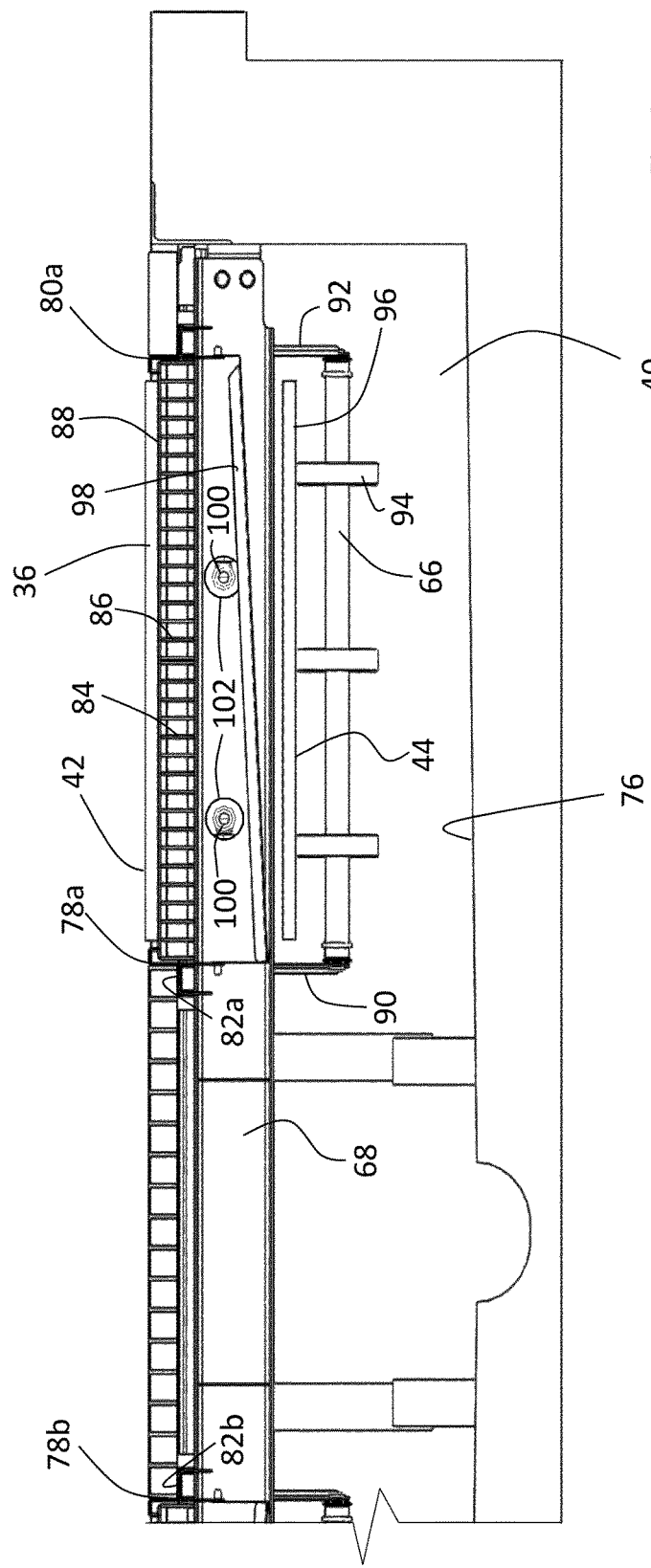

VEHICLE CONVEYOR ASSEMBLY WITH HEATER

FIELD

The present disclosure relates to the field of conveyor systems for transporting wheeled structures, and in particular to a conveyor system incorporating a heater to provide heat to at least a portion thereof.

BACKGROUND

Conveyor systems have long been used to assist in the transport of materials from one location to another, in particular with respect to heavy and cumbersome items. The use of conveyor systems in assembly lines is well documented, with perhaps Henry Ford being the most famous proponent of the technology of the 20$^{th}$ century.

Conveyors come in a variety of configurations, suiting a wide array of implementations. Belt conveyors in particular have been widely adopted due to their wide versatility and adaptability. For example, belt conveyors are commonly used in the warehousing, manufacturing, and mining sectors. More recently, belt conveyors have found application in the automotive industry, in particular with respect to automated car wash stations.

A recent advancement in automated car washes is the synchronous dual-belt conveyor system for moving the vehicle through the wash tunnel. The dual-belt system is especially suited for modern vehicles as the previous roller conveyor system with alignment rails has the potential to interfere with low profile rims and lower underbody clearance. The older roller conveyor system also required more alignment precision when entering the wash tunnel, resulting in many car owners turning to alternate cleaning options.

With the introduction of the dual-belt car wash conveyor system, and the adoption of this technology in an increasing number of car wash stations, new challenges are faced, in particular with respect to cold weather installations. During winter months in regions of colder temperatures, the wash tunnels may experience freeze events in which water freezes upon the belt and underlying substructure. The shear loads placed upon the conveyor drive mechanisms can be considerable, leading to damage and servicing down-time.

It is recognized that a need still exists to provide a conveyor system capable of operating in regions of colder temperature with lower risks associated with freeze events.

SUMMARY

According to an aspect of an embodiment, a conveyor system for use in moving a wheeled structure through a service line is provided. The conveyor system comprises at least one endless belt mounted in a longitudinal direction through the service line. The endless belt has an upper transport portion adapted to move the vehicle through the service line, and a lower return portion. A support deck is positioned below the upper transport portion of the endless belt to support the endless belt. A debris deflector is mounted between the upper transport portion and the lower return portion of the endless belt to protect the lower return portion from debris falling through the support deck. A heater is mounted between the debris deflector and the support deck along at least a portion of a longitudinal length of the service line. The debris deflector and the support deck define a region of higher heat concentration relative to an area below the debris deflector, within which heat emitted from the heating means is directed towards the support deck.

BRIEF DESCRIPTION OF FIGURES

The foregoing and other features and advantages of the disclosure will be apparent from the following description of embodiments hereof as illustrated in the accompanying drawing. The accompanying drawings, which are incorporated herein and form a part of the specification, further serve to explain the principles of the disclosure and to enable a person skilled in the pertinent art to make and use the disclosure. The drawings are not to scale.

FIG. 1 is a plan view of the conveyor system according to an embodiment hereof.

FIG. 2a is a partial side sectional view of the conveyor system according to the embodiment of FIG. 1.

FIG. 2b is a partial side sectional view of the conveyor system with reference to line 2b-2b of FIG. 2a.

FIG. 2c is a partial side sectional view of the conveyor system with reference to line 2c-2c of FIG. 2a.

FIG. 3b is a partial isometric view of the conveyor system with reference to line 3b-3b of FIG. 3a.

FIG. 4 is a partial transverse sectional view of the conveyor system according to FIG. 1, highlighting features in the region of the endless belt.

DETAILED DESCRIPTION

Figure 3A:
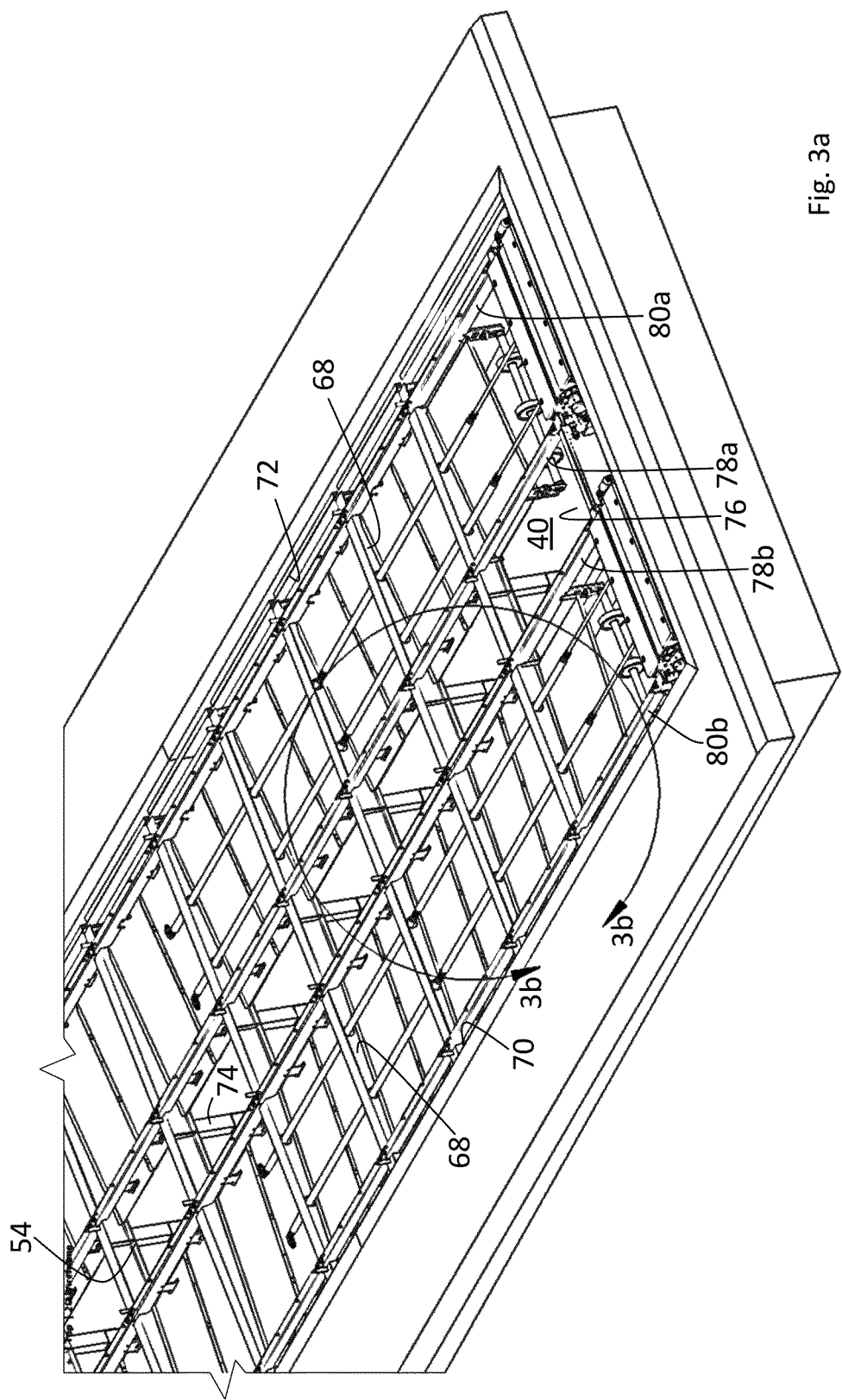
FIG. 3a is a partial isometric view of the conveyor system according to the embodiment of FIG. 1, highlighting features of the conveyor frame.

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Reference is made to FIG. 1, which shows a service line 10 having a conveyor system 20 for moving a wheeled structure 11, in accordance with an embodiment. As used herein, the term service line is not intended to be restrictive, and may encompass for example an automatic vehicle wash station (e.g. for cars, commercial trucks, etc.), a manufacturing or assembly line (e.g. for cars, trucks, non-powered mobile units, etc.) as well as a repair or detailing station (e.g. for cars, trucks, etc.). In addition, the term wheeled structure is not intended to be restrictive, and may encompass for example powered landborne vehicles (e.g. trucks, automobiles, tractors, recreational vehicles, etc.), non-powered landborne mobile units (e.g. recreational trailers, utility trailers, etc.), and airborne vehicles (e.g. airplanes, etc.).

The conveyor system 20 is adapted to transport a wheeled structure along a longitudinal length of the service line 10. As presented in FIG. 1, service line 10 is shown in the form of a car wash station having a wash tunnel 22. Accordingly, the conveyor system 20 includes a service zone 24 within the region of the wash tunnel 22 through which the vehicle is transported for a wash cycle. The conveyor system 20 also includes a loading zone 26 adjacent a tunnel entrance 28, where vehicles align and initially load onto the conveyor system 20.

The conveyor system 20 is configured as a dual-belt system comprising a pair of endless belts mounted in a longitudinal direction through the service line 10. The endless belts 36a, 36b are positioned in parallel and spaced-apart relationship relative to one another through the loading and service zones 26, 24. In the region between the pair of endless belts 36a, 36b, there may be positioned a central stationary platform 38 of removable panels that permit access to regions under the pair of endless belts 36a, 36b, in particular for servicing and maintenance. It will be appreciated that where the conveyor system 20 is provided with two or more endless belts to transport the wheeled structure along the service line 10, the endless belts will move in synchronous motion. As the arrangement for each of the endless belts 36a, 36b is substantially identical, the endless belts 36a, 36b are herein collectively referred to as the endless belt 36 unless otherwise specified.

Turning now to FIGS. 2a, 2b and 2c, the conveyor system 20 is generally supported within a trench 40 having a depth suitable to house the required drive and guide mechanisms, and to permit manoeuvrability to service personnel. The endless belt 36 has an upper transport portion 42 and a lower return portion 44, and extends along the conveyor system 20 between a drive end 46 and an idler end 48. The drive end 46 and idler end 48 provide axially elongated rollers 50, 52 rotatably supported on a conveyor frame 54, to guide the endless belt 36 around the respective drive and idler ends 46, 48.

The drive end 46 includes a drive module 56 adapted to engage and move the endless belt around the drive and idler ends 46, 48. The drive module 56 may be an electric motor as shown, and may include at least one drive member 58 to engage the endless belt 36 and move it around the respective drive and idler ends 46, 48. As shown, the drive member 58 is provided in the form of a sprocket drum 60 adapted with teeth 62 to engage complementary tracks (not shown) on the inward surface 64 of the endless belt 36. The conveyor system 20 will additionally include guide members 66 supported upon the conveyor frame 54 to support the lower return portion 44 of the endless belt 36 as it moves back towards the idler end 48 on the underside of the conveyor system 20. As shown, the guide members 66 are provided in the form of rollers.

In motion, the upper transport portion 42 of the endless belt 36 moves in tension from the idler end 48 towards the drive end 46 by drive member 58, while the lower return portion 44 moves in a slackened state from the drive end 46 towards the idler end 48.

Figure 3B:
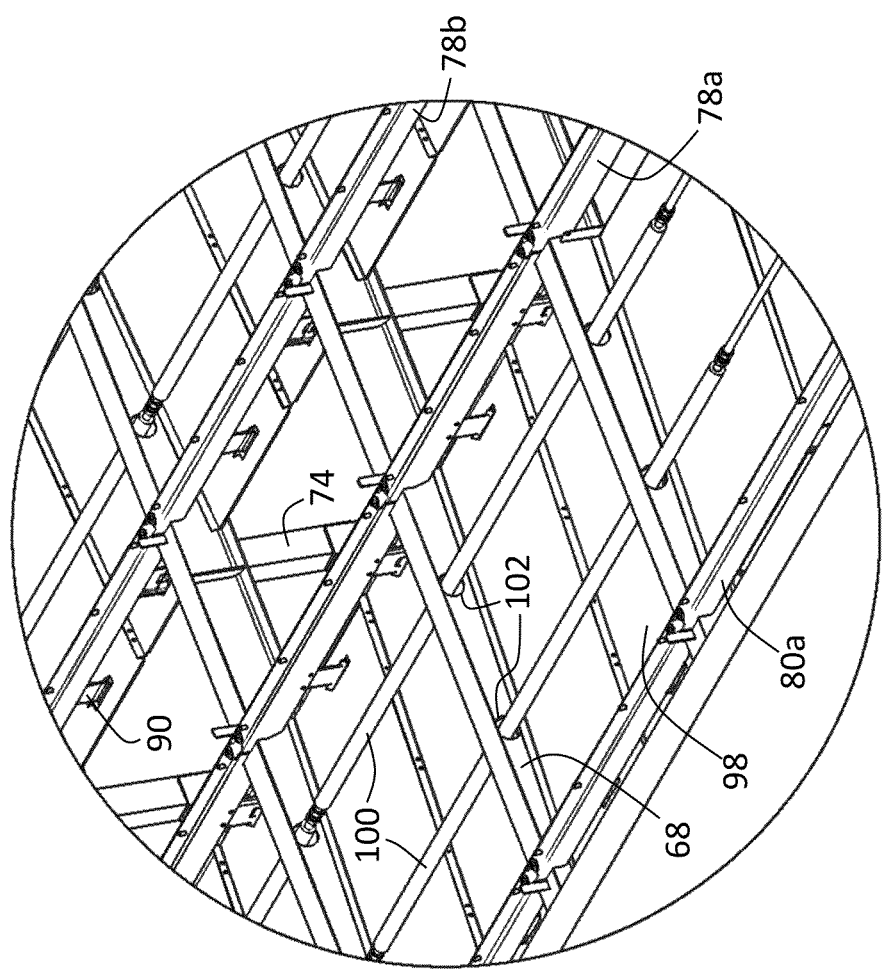

Turning now to FIGS. 3a and 3b, shown is an enlarged view of the conveyor system 20 with the endless belt 36 and associated support structure removed to highlight features of the conveyor frame 54. The conveyor frame 54 includes a plurality of cross-members 68 positioned transversely relative to the longitudinal direction of the service line 10. The cross-members 68 are dimensioned to span the width of the trench 40, and are adapted to mount on opposing surfaces 70, 72. Each cross-member 68 also provides at least one footing 74 at approximately a midpoint thereof, extending to a floor 76 of the trench 40 to provide additional load-bearing performance to the conveyor frame 54.

Arranged in the longitudinal direction, the conveyor frame 54 additionally provides a plurality of support rails that extend the longitudinal length of the service line 10, from the idler end 48 to the drive end 46. The support rails are arranged as two inner support rails 78a, 78b and two outer support rails 80a, 80b. The inner support rails 78a, 78b are generally positioned symmetrically about the longitudinal centerline of the service line 10, while the two outer support rails 80a, 80b are situated proximal to the longitudinal walls of the trench 40. The inner support rails 78a, 78b and the outer support rails 80a, 80b may be fixedly attached in place by rivets, threaded fasteners (e.g. bolts), metallurgic bonding (e.g. welded attachment) or any other suitable means to achieve a secure attachment.

Having reference to FIG. 4, the inner support rails 78a, 78b cooperatively define a gap spacing for the central stationary platform 38 provided between the endless belts 36a, 36b. The inner support rails 78a, 78b each provide a respective seat 82a, 82b configured to receive and support the central stationary platform 38. In the embodiment shown, the central stationary platform 38 is provided in the form of fiberglass or thermoplastic grating. In addition, for each endless belt 36, the respective opposing inner and outer rails 78a, 80a define a gap spacing to receive a support deck 84. The support deck 84 generally includes a plurality of modular grid panels 86 adapted to be positioned end to end relative to one another along the longitudinal length of the service line 10. The modular grid panels are provided with a length that aligns the point of contact between adjacent grid panels on a transverse cross-member 68, providing weight-bearing support thereto. The support deck 84 is positioned between the upper transport portion 42 and lower return portion 44 of the endless belt 36, generally in close proximity to the upper transport portion 42. In this way, the support deck 84 provides support to the upper transport portion 42 of the endless belt 36, and thereby a load placed thereon from a wheeled structure placed upon the conveyor system 20. To facilitate sliding of the endless belt over the support deck 84, a wear plate 88 may be provided between the upper transport portion 42 and the support deck 84. The arrangement of the inner and outer support rails 78a, 78b, 80a, 80b may additionally be used to mount the guide member 66 supporting the lower return portion 44 of the endless belt 36. As shown, the inner and outer support rails 78a, 80a provide respective guide hangers 90, 92 that support the guide member 66 in a transverse direction relative to the longitudinal direction of the service line 10. As shown, the guide member 66 is provided with a plurality of rollers 94 that support an outward surface 96 of the endless belt 36 along the lower return portion 44.

Continuing with FIG. 4, also provided between the upper transport portion 42 and the lower return portion 44 of the endless belt 36, and in particular between the support deck 84 and the lower return portion 44 is a debris deflector 98. The debris deflector 98 provides a barrier to protect the lower return portion 44 from debris falling from the support deck 84, in particular where the support deck 84 is provided in the form of the modular grid panels. The debris deflector 98 is generally mounted on an angle directed downwardly towards the longitudinal centerline of the service line. The debris deflector 98 may be mounted on dedicated brackets, or may be mounted on the guide hangers 90, 92 used for supporting the guide members 66 (as shown). The debris deflector 98 is generally configured to provide a contiguous barrier between adjacent cross-members, so as to maximize the protection from falling debris. In some embodiments, the debris deflector 98 may be provided in the form of multiple panels arranged and fastened in side-by-side relationship to one another.

It will be recognized that the arrangement of the support deck 84, the debris deflector 98 and the longitudinally-spaced cross-members 68 define a partial enclosure in the region between the upper transport portion 42 and the lower return portion 44 of the endless belt 36. To assist in reducing the likelihood of freezing conditions on the conveyor system 10, in particular sections exposed to the outside environment, such as the loading zone 26 shown in FIG. 1, at least a portion of the conveyor system 20 may include a heater in these partial enclosures between adjacent cross-members 68. Referring to FIGS. 3 and 4, the conveyor system 20 provides a heater 100 positioned between the support deck 84 and the debris deflector 98, extending in the longitudinal direction across one or more of the partial enclosures delimited longitudinally between adjacent cross members 68. Accordingly, the partial enclosures containing the heater 100 provide a region of higher heat concentration relative to other areas within the trench 40, in particular the area below the debris deflector 98. In this way, the support deck 84, the endless belt 36 supported thereon, and the wear plate 88 positioned therebetween receive heat from the region of higher heat concentration, thereby reducing the likelihood of a freeze event in the conveyor system 20. It will be appreciated that freeze events in conveyor systems can result in extensive damage to the endless belt 36 and/or drive module 56.

To enable passage of the heater 100 between adjacent partial enclosures separated by the cross-members 68, the cross-members 68 are adapted with one or more pass-through apertures 102, depending on whether the heater is adapted to pass once through the desired heated portion, or in a serpentine path therethrough. In the embodiment shown in FIG. 4, two pass-through apertures are provided for each side of the conveyor system 20.

It will be appreciated that the heater 100 may take on a variety of forms. For example, the heater 100 may be configured as a convective heater, such as a convective tube heater including both smooth and finned-tube varieties. A convective tube heater will generally be part of a fluid circuit having an electric or gas-fired heater module to deliver a heated fluid therein. The heater 100 may also be configured as a radiant heater such as a gas-fired radiant tube heater.

The debris deflector 98 may be formed from any suitable material including but not limited to metal (e.g. steel, aluminum, etc.), thermoplastics (e.g. polypropylene, polyethethylene, etc.) and composites. To promote direction of the emitted heat from heater 100 towards the support deck 84, the debris deflector 98 may be adapted with at least a selected level of thermal reflectivity. The thermal reflectivity may be achieved by constructing the debris deflector 98 in the form of a radiant barrier. Alternatively, a radiant barrier may be separately formed and applied to the debris deflector 98, for example in the form of a thin radiant barrier sheet attached thereto. Radiant barriers are typically highly reflective materials (e.g. aluminum or polished stainless steel foil) applied to a substrate. Exemplary substrates may include kraft paper, oriented strand board, plastic films and plywood. For environments that experience high moisture levels, for example a car wash tunnel, the substrate may be of metal or thermoplastic construction. Exemplary thermoplastic substrates may include polypropylene or polyethylene foam core. In general, the material applied to the substrate should exhibit an emittance of less than 0.25, as measured by ASTM C1371. In addition to polished metallic films, low-emittance coatings such as metal oxide may be used on a suitable substrate. It will be appreciated that the side of the debris deflector 98, or separately formed sheet, facing the support deck 84 is the side adapted to receive the highly reflective material. In other words, the highly reflective material, and thus the effective side of the radiant barrier is intended to face the region of higher heat concentration between the debris deflector 98 and the support deck 84.

It will be appreciated that, although embodiments of the disclosure have been described and illustrated in detail, various modifications and changes may be made. While preferred embodiments are described above, some of the features described above can be replaced or even omitted. Still further alternatives and modifications may occur to those skilled in the art. All such alternatives and modifications are believed to be within the scope of the disclosure

What is claimed is:

1. A conveyor system for use in moving a wheeled structure through a service line, the conveyor system comprising:
   at least one endless belt mounted in a longitudinal direction through the service line, the endless belt having an upper transport portion adapted to move the wheeled structure through the service line, and a lower return portion;
   a support deck positioned below the upper transport portion of the endless belt to support the endless belt;
   a debris deflector mounted between the upper transport portion and the lower return portion of the endless belt to protect the lower return portion from debris falling through the support deck; and
   a heater mounted between the debris deflector and the support deck along at least a portion of a longitudinal length of the service line,
   wherein the debris deflector and the support deck define a region of higher heat concentration relative to an area below the debris deflector, within which heat emitted from the heater is directed towards the support deck.

2. A conveyor system according to claim 1, further comprising a plurality of cross-members adapted to support the support deck in a trench housing the conveyor system.

3. A conveyor system according to claim 2, wherein the cross-members located in the portion of the service line receiving the heater are adapted with at least one pass-through aperture to permit passage of the heater therethrough, the cross-members further delineating longitudinally the region of higher heat concentration into one or more partial enclosures.

4. A conveyor system according to claim 1, wherein the heater is a convective heater.

5. A conveyor system according to claim 1, wherein the heater is a radiant heater.

6. A conveyor system according to claim 1, wherein the heater is configured as a tube heater.

7. A conveyor system according to claim 6, wherein the tube heater is aligned generally longitudinally along the longitudinal length of the service line, and is adapted to pass at least once through the portion of the service line receiving the heating means.

8. A conveyor system according to claim 7, wherein the heater tube is arranged in a serpentine path to provide at least two passes through the portion of the service line receiving the heating means.

9. A conveyor system according to claim 6, wherein the tube heater is a finned-tube heater.

10. A conveyor system according to claim 1, wherein the support deck is a plurality of modular grid panels adapted to be positioned end to end relative to one another under the upper transport portion of the endless belt.

11. A conveyor system according to claim 1, wherein the debris deflector is adapted with at least a selected level of thermal reflectivity to redirect heat emitted from the heating means towards the support deck.

12. A conveyor system according to claim 1, wherein the debris deflector is formed of a thermoplastic material, and wherein a material of low emissivity is applied to a surface of the thermoplastic material on a side facing the support deck to redirect heat emitted from the heater towards the support deck.

13. A conveyor system according to claim 12, wherein the material of low emissivity is a metallic reflecting agent.

14. A conveyor system according to claim 13, wherein the material of low emissivity is an aluminum or stainless steel foil.

15. A conveyor system according to claim 1, wherein the conveyor system of includes an indoor portion and an outdoor portion.

16. A conveyor system according to claim 15, wherein the indoor portion is positioned in a service zone of the service line, while the outdoor portion is positioned in a loading zone of the service line.

17. A conveyor system according to claim 15, wherein the portion of the service line receiving the heater is the outdoor portion.

18. A conveyor system according to claim 1, wherein the service line is a car wash tunnel, and wherein the region of higher heat concentration reduces the likelihood of ice accumulation on the endless belt during use.

\* \* \* \* \*